United States Patent [19]

Graham

[11] 4,141,536
[45] Feb. 27, 1979

[54] BALL TYPE VALVE WITH HIGH PRESSURE SEALING CAPABILITY

[75] Inventor: William J. Graham, Metairie, La.

[73] Assignee: Texaco Inc., New York, N.Y.

[21] Appl. No.: 800,263

[22] Filed: May 25, 1977

[51] Int. Cl.² ............................................. F16R 25/00
[52] U.S. Cl. ..................................... 251/161; 251/163
[58] Field of Search .............................. 251/161, 163

[56] References Cited

U.S. PATENT DOCUMENTS

| | | | |
|---|---|---|---|
| 2,200,474 | 5/1940 | Heggem | 251/163 |
| 2,719,022 | 9/1955 | Blevaus | 251/163 |
| 2,744,720 | 5/1956 | Wilms | 251/161 |
| 3,033,513 | 5/1962 | Vulliez | 251/163 |
| 3,473,554 | 10/1969 | King | 251/163 X |
| 3,941,351 | 3/1976 | Graham | 251/161 |

Primary Examiner—Harold W. Weakley
Attorney, Agent, or Firm—Thomas H. Whaley; Carl G. Ries; Henry C. Dearborn

[57] ABSTRACT

An improvement of a ball type valve having capability of conventional closing by quarter turn rotation of the ball, plus pressure sealing of the valve when closed by rocking about a tangential axis. It provides improved structure that permits both the closing and the pressure sealing with less than a half turn of a control handle for each. It simplifies and strengthens the working parts compared to an earlier valve by the same inventor.

3 Claims, 9 Drawing Figures

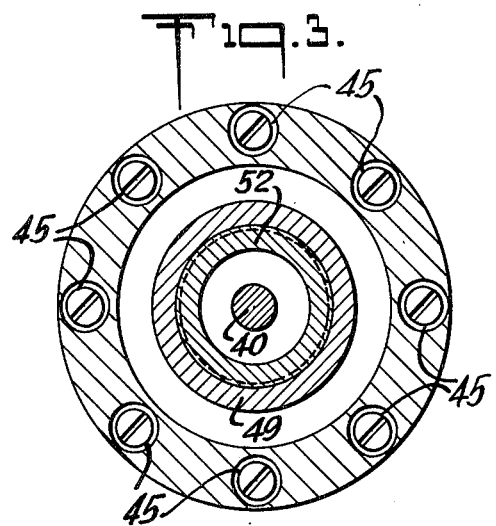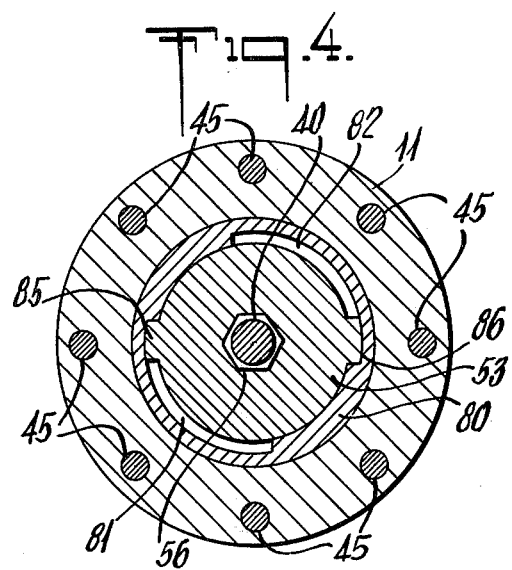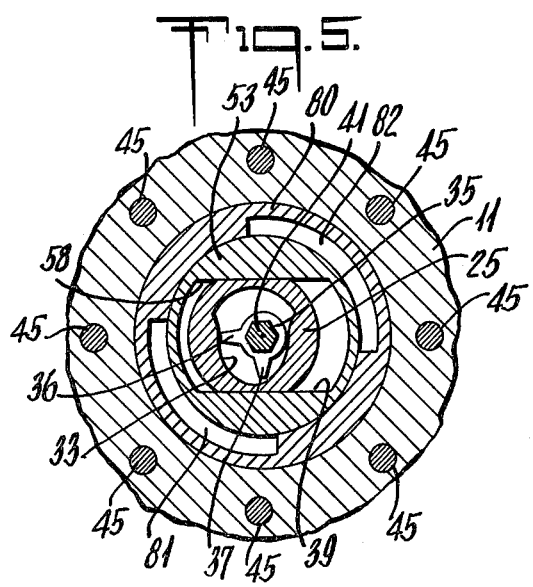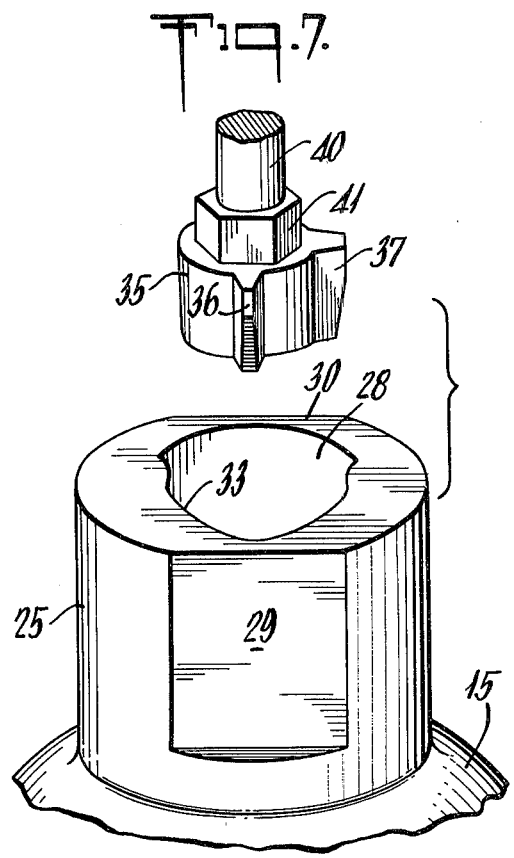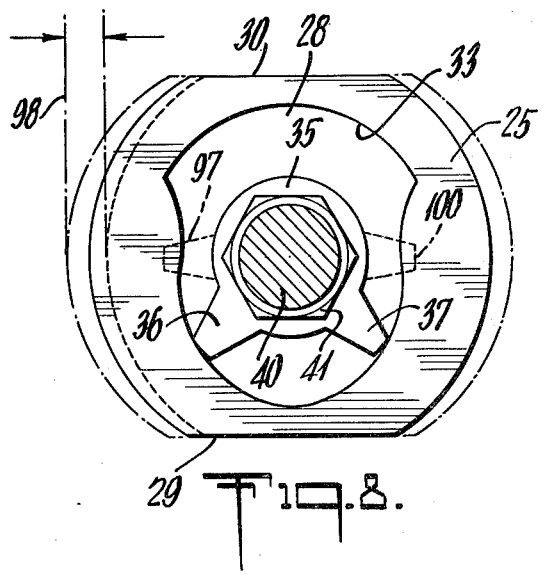

Fig. 6a.
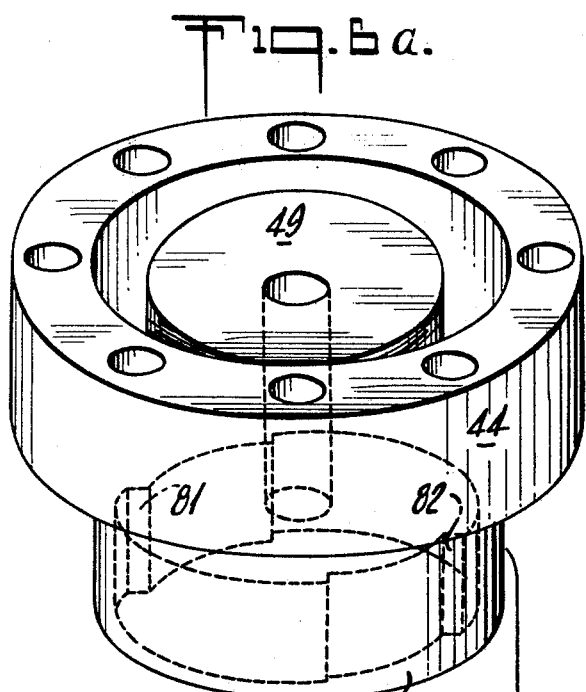
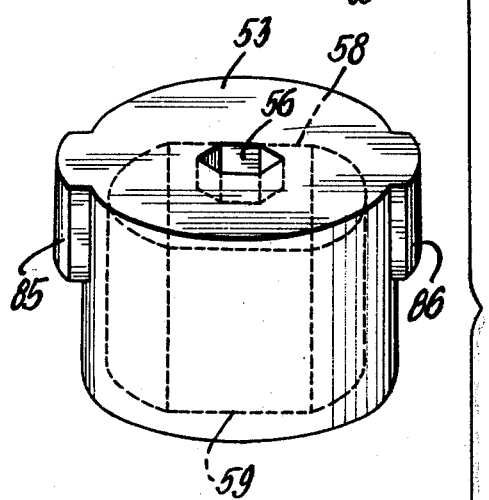
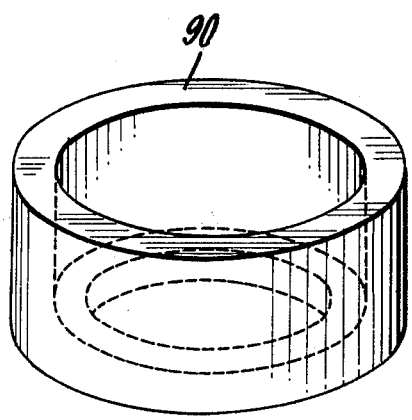
Fig. 6b.
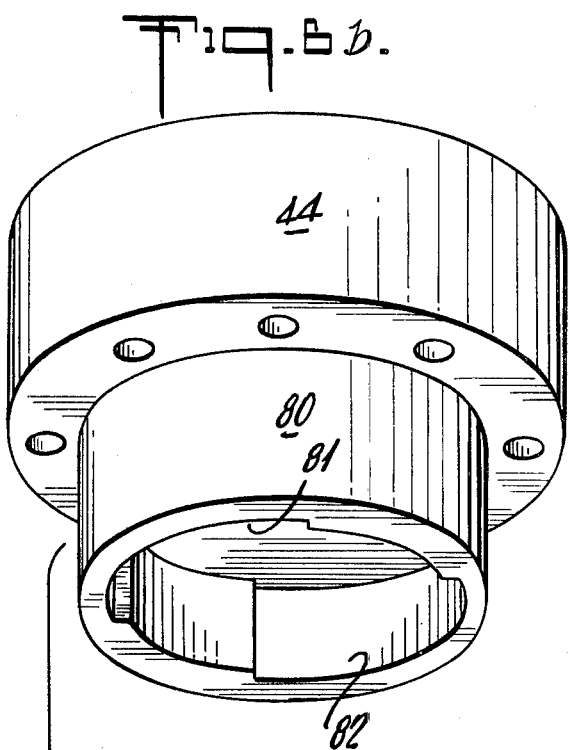
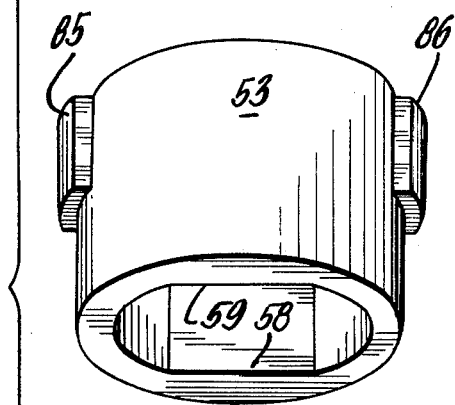
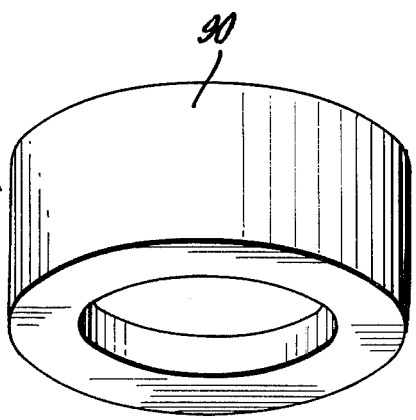

BALL TYPE VALVE WITH HIGH PRESSURE SEALING CAPABILITY

BACKGROUND OF THE INVENTION

1. Field of the Invention

This invention concerns valves in general, and more specifically deals with an improvement for a ball type valve which has high pressure sealing capability.

2. Description of the Prior Art

This invention deals with an improvement over the prior invention described and claimed in U.S. Pat. No. 3,941,351 issued Mar. 2, 1976. As indicated in that patent, it provided an improvement upon its prior structure mentioned therein. It discloses a combination that permits actuation of a ball type valve in such a manner as to greatly reduce the height of the valve stem while at the same time providing for short stroke actuation of both the primary closing function and the pressure sealing action. This invention provides an improved structure which can accomplish the same general purpose but in a better and more positive manner.

SUMMARY OF THE INVENTION

Briefly, the invention relates to an improvement for a combination with a ball type valve for use in high pressure or severe conditions. The said valve has a valve handle and a spherical core cooperating with a valve seat in a body with a fluid passage therethrough. The said core is rotatable about an axis transverse to said fluid passage, and it has an opening therethrough for alignment with said passage when in the fully opened position. The said core is also rotatable a limited amount about another axis tangential to said core for forcing it against said seat. In combination with the foregoing elements, the improvement comprises means for actuating said core with less than a half turn of said handle for each of said rotations. The said core coaxial with said transverse axis and having an axially located recess therein. It also comprises a radially contoured cam surface on said recess, and a cam operatively connected to said handle and located in operative relation with said cam surface in order to force said core against said seat. It also comprises means for alternatively rotating said stem and said cam relative to said stem for closing and tightening said valve.

Again briefly, the invention is in combination with a ball type valve for use in high pressure or severe conditions. The said valve has a valve handle and a spherical core cooperating with a valve seat in a body with a fluid passage therethrough. The said core is rotatable about an axis transverse to said fluid passage and has an opening therethrough for alignment with said passage when in the fully opened position. Also the said core is rotatable a limited amount about another axis tangential to said core for forcing it against said seat. The improvement which is in combination with the foregoing elements, comprises a short stem on said core coaxial with said transverse axis, and a pair of parallel flat faces on the outside of said stem. The said flat faces lie transverse to the axis of said opening through the core. It also comprises an axially located recess in said stem. The said recess has a radially contoured cam surface on the walls thereof. It also comprises a cam operatively related to said cam surface and integrally attached to one end of a shaft for connecting the cam to said handle. The said shaft has a hexagonal element integral therewith located adjacent to said cam. It also comprises an inverted cup-shaped cylindrical element having a complimentary hexagonal opening for cooperating with said hexagonal element and located axially in the bottom of said cylindrical element. The said cylindrical element has a pair of parallel flat faces on the inside for cooperating with said stem flat faces to cause said stem and cylindrical element to rotate together at all times while permitting lateral movement of said stem relative to said cylindrical element. It also comprises a pressure seal mounted on said valve body and supporting said shaft, and a lever associated with said handle for shifting said shaft longitudinally from one position with said hexagonal element engaged in said hexagonal opening in order to be able to rotate said core to and from the fully opened position by rotating said cylindrical element. The said shaft rotating said cam relative to said stem when shifted to the other position so as to force said core against said seat by rotating the core a limited amount about said tangential axis.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 3 is a reduced cross-sectional view taken along the lines 3—3 of FIG. 1, looking in the direction of the arrows;

FIG. 4 is another reduced cross-sectional view taken along the lines 4—4 of FIG. 1, looking in the direction of the arrows;

FIG. 5 is yet another reduced cross-sectional view, taken along the lines 5—5 of FIG. 1 and looking in the direction of the arrows;

FIG. 6a is a somewhat enlarged downward perspective exploded view, showing some of the internal elements;

FIG. 6b is a similarly enlarged upward looking perspective exploded view like FIG. 6a and showing the same elements;

FIG. 7 is a perspective view showing the cam and cam surface of the valve stem, in exploded relationship; and FIG. 8 is an enlarged plan view partly in cross-section, showing the valve stem and indicating the cam action.

DESCRIPTION OF THE PREFERRED EMBODIMENT

Figure 1:
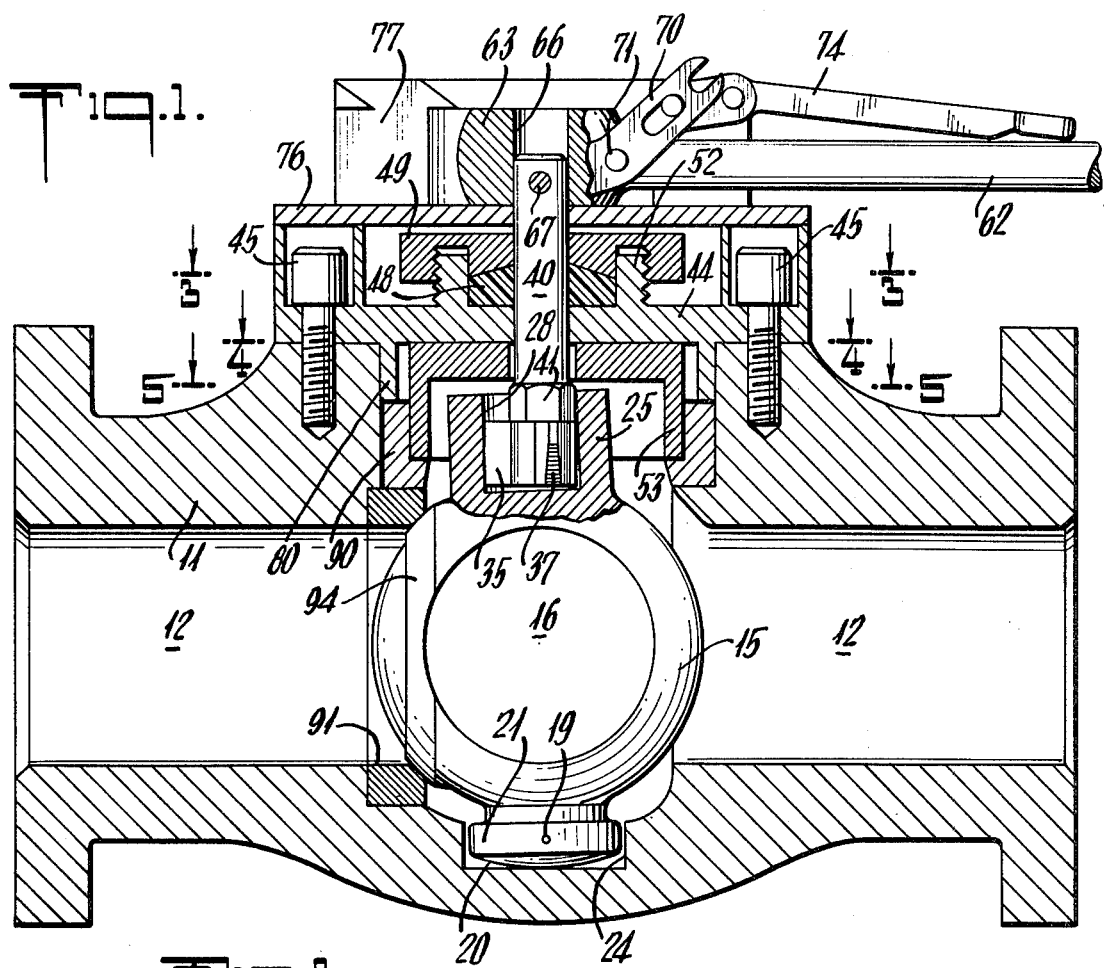
FIG. 1 is a longitudinal, cross-sectional view of a valve according to the invention.
Figure 2:
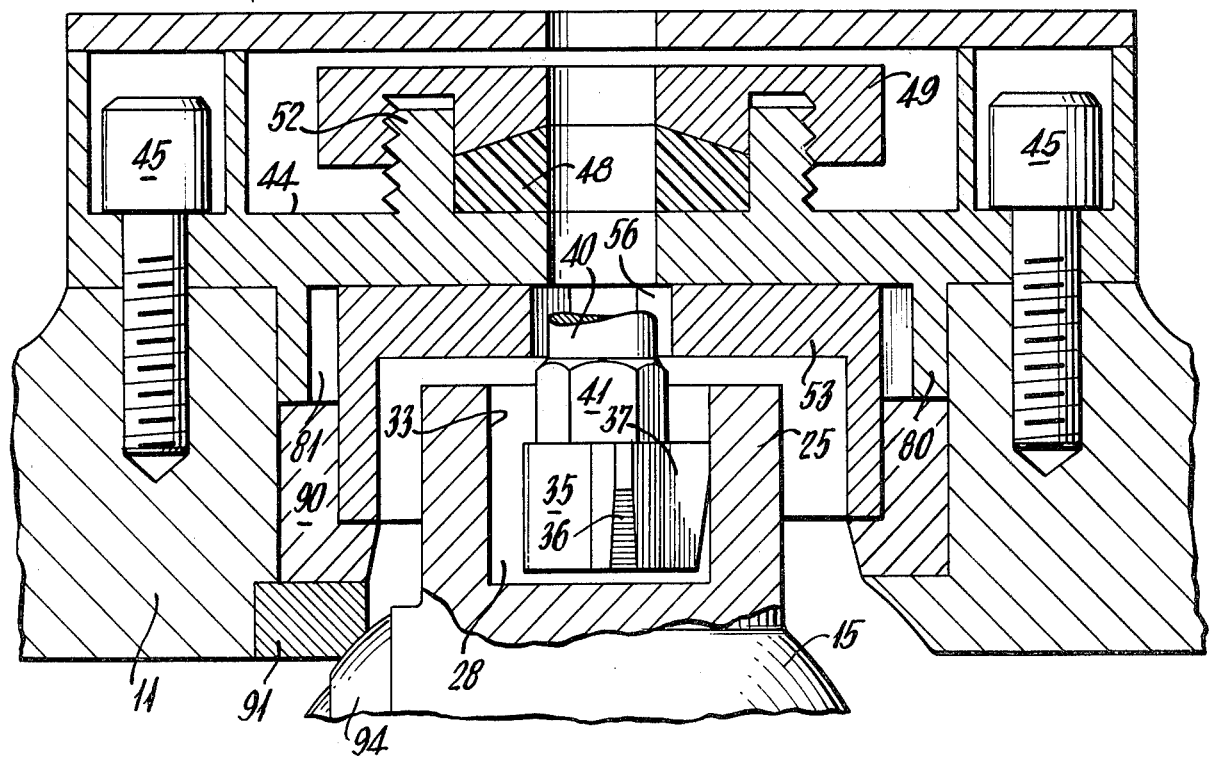
FIG. 2 is an enlarged central portion of the FIG. 1 showing.

Referring to FIG. 1 it may be noted that the basic elements of this valve are substantially like those shown and described in my aforementioned U.S. Pat. No. 3,941,351. Thus, there is a valve body 11 which has a fluid passage 12 therethrough. There is a valve core 15 that is rotatable about an axis which is transverse to the passage 12. The core 15 has an opening 16 therethrough which is substantially the same diameter as the fluid passage 12. And, when the valve is in the fully opened position, the opening 16 is in alignment with the passage 12.

It will also be understood that the core 15 is rotatable a limited amount about another axis 19. Axis 19 is tangential to the core 15 and lies diagonally across a spherical curved outer surface 20 on a hub 21. The hub 21 is located at the lower end of the core 15 as viewed in FIG. 1. It will be noted that there is a circular recess 24 in the body 11 of the valve. This recess 24 receives the hub 21 and permits free rotation of the core 15 and integral hub 21 as well as rocking movement of both about the axis 19.

On the top (as viewed in FIG. 1) of the core 15 there is an integrally formed stem 25 that has an axially located recess 28 therein. Also, as illustrated in FIG. 7, the stem 25 has a pair of parallel flat faces 29 and 30 on the outside thereof, which faces lie transversly relative to the axis of the opening 16 through the core 15.

As shown in FIGS. 7 and 8, the recess 28 in the stem 25 has a radially contoured cam surface 33 that is symmetrical about a transverse diameter that lies at right angles to the planes of the flat faces 29 and 30.

There is a cam 35 that acts cooperatively with the cam surfaces 33 by means of a pair of protrusions, or ears 36 and 37 which are integrally part of the cam 35.

The cam 35 is integrally attached to one end of a shaft 40 which has a hexagonal element 41 at the same end as the cam 35 but located between the cam and the cylindrical shaft 40.

The shaft 40 is rotatably supported by a bonnet 44 that is securely attached to the body 11 of the valve by means of a plurality of peripherally located bolts 45. Also, there is a pressure seal structure for the shaft 40 which structure includes a flexible washer 48 that is compressed against the shaft 40 by a cap 49. The cap 49 is threaded onto a collar 52 that is integral with the bonnet 44.

There is an inverted cup-shaped cylindrical element 53 that has a hexagonal opening 56 through the top thereof. Hexagonal opening 56 is for cooperating with the hexagonal element 41 located on the shaft 40. The cylindrical element 53 has a pair of parallel flat faces 58 and 59 that are best seen in the illustration of FIG. 6b. It may be noted that these flat faces 58 and 59 cooperate with the faces 29 and 30 on the stem 25. However, faces 58 and 59 extend laterally sufficiently farther than the faces 29 and 30 to permit the lateral movement of the stem 25 that takes place as the core 15 is rotated about the transverse tangential axis 19.

At the top of the shaft 40 there is a handle 62 which has a head 63 that surrounds the end of the shaft 40 in order to rotate the shaft 40. There is a hole 66 in the head 63 which hole accomodates the shaft 40 for free vertical sliding motion therein. A cross pin 67 goes through the shaft 40 and is attached to a pair of lever arms 70 that are pivoted about a cross shaft 71 in the head 63. These lever arms 70 act to shift the shaft 40 from the lower position which is illustrated in FIG. 1, to an upper position (not shown) such that the hexagonal element 41 near the other end of the shaft 40 is in engagement with the hexagonal opening 56.

It may be desirable to have the upper end of the shaft 40 have a non-circular cross-section, e.g. hexagonal so as to assist in transmitting torque to the shaft 40 from the handle 62. Such structure is shown in my above noted patent.

There is a disengageable lever handle 74 that cooperates with the pair of lever arms 70 for shifting the shaft 40 longitudinally from one position to the other. It may be noted that this lever handle 74 is shown in FIG. 1 in its disengaged state with respect to the lever arms 70. However, when engaged, it will provide additional leverage for actuating the lever arms 70 to do the shifting of the shaft 40. These elements along with the handle 62 are substantially like the corresponding elements illustrated and described in my above-mentioned prior patent, and consequently no more detailed explanation is required here. Also, there is a plate 76 with super structure 77 thereon, both of which are illustrated in greater detail in my aforementioned prior patent.

The bonnet 44 has a depending cylindrical sleeve 80 which surrounds the top of the element 53. Sleeve 80 has about 90° cut-out sections 81 and 82 that accomodate a pair of protrusions or ears 85 and 86 respectively that are located on the upper portion of the element 53. These cut-out sections 81 and 82 permit only a 90° rotation of the cylindrical element 53 along with the stem 25 of the core 15. Such action takes place when the valve is being rotated from fully opened to closed position.

There is a cylindrical retainer ring 90 that surrounds and vertically supports the cup-shaped element 53. Also, there is a hard faced ring 91 that is mounted in the body 11 of the valve and acts as the valve seat. It wil be understood that there is also a hard material ring 94 that is mounted on the core 15 to act in cooperation with the ring 91 to create a pressure seal when the valve has been tightly closed.

OPERATION

Referring to FIG. 1 again, it may be noted that the elements of the valve are shown in the position corresponding to the tightly closed condition for the valve. Thus, the core 15 is positioned at right angles to the passage 12 through the body 11 of the valve. Also, the core has been rotated or rocked about the tangential axis 19 to apply pressure for making a tight seal contact between the ring 94 on the core 15 and the valve seat 91. The force for applying the pressure is transmitted from the cam 35 to the cam surface 33 of the stem 25 which rocks the core. This takes place as the shaft 40 is rotated so as to rotate the cam 35 relative to the stem 25. This produces the cam action which makes the rocking movement or rotation in a limited amount about the tangential axis 19. The FIG. 8 illustration indicates this action. Thus, the cam protrusion on ear 36 will be rotated clockwise toward the position indicated in dashed lines 97 which will move the stem 25 laterally toward the extreme position as indicated by a left-hand dimension line 98 shown.

Opening of the valve from its tightly closed position first involves release of the pressure created by the cam followed by the opening to full open position by turning of the core 15. Thus, the first action is carried out with the shaft 40 in the position illustrated in FIG. 1 with the hexagonal element 41 out of engagement with the hexagonal hole 56 in the cylindrical inverted cup-shaped element 53. Such releasing action is carried out by rotating the shaft 40, and the cam 35 along with it, in a counter clockwise direction as viewed in FIG. 8. This caused the stem 25 and consequently the core 15 to be rocked to the right as viewed in FIG. 1 so as to release the pressure against the valve seat 91. Following approximately a 90° rotation in this counter clockwise direction, the core and stem will be rocked back to substantially vertical position with the cam ear 37 in the position indicated by dashed lines 100 illustrated in FIG. 8. When that position has been reached, the valve will be cracked open but the core 15 will still be positioned with its opening 16 at right angles to the passage 12 through the valve.

Next, the shaft 40 will be raised up vertically by shifting the lever arms 70 to clockwise rotated position from that illustrated in FIG. 1. Therefore the pin 67 and shaft 40 will be raised vertically to the upper position such that the hexagonal element 41 will be in engagement with the complimentary hexagonal hole 56 in the cylindrical element 53. Of course, the lever handle 74 will be used in shifting the lever arms 70 after reengaging them.

Then, the handle 62 will be rotated through another 90° angle and this will rotate the inverted cup-shaped cylindrical element 53 through that angle, along with the stem 25 and consequently the core 15 of the valve. This effects the opening of the valve from its nearly closed position to its fully opened position, i.e. with the passage 16 in alignment with the fluid passage 12 through the valve. It may be noted that this 90° rotation is the extent to which the cup-shaped cylindrical element 53 is permitted to rotate, by reason of the ears 85 and 86 thereon which move in rotation within the cut out sections 81 and 82 of the depending sleeve 80. Sleeve 80 is part of the bonnet 44.

It will be clear that the closing of the valve is substantially the reverse operation of that just described, so that from fully opened position the handle 62 will be rotated 90° in a clockwise direction which will turn the shaft 40 along with the inverted cup-shaped element 53 which is positively engaged thereto by reason of the hexagonal element 41 being in the complimentary hexagonal shaped opening 56 thereof. This rotation carries with it the core 15 by reason of the flat faces on the stem 25, which are in cooperative relation with the inner flat faces of the cup-shaped element 53. During this 90° rotation there will be no relative movement between the cam 35 and the inner cam surface 33 on the stem 25.

Then when the ears or lugs 85 and 86 on the inverted cup-shaped element 53 have contacted the ends of the cut out sections 81 and 82 on the inside of the depending sleeve from the bonnet 44, the shaft 40 will be moved vertically downward until the lower position is reached so that the hexagonal element 41 has been disengaged from the corresponding hexagonal opening 56. Now, the handle 62 will be rotated a further 90° and this will cause rotation of the cam 35 along with its protrusions 36 and 37 that are in contact with the cam surface 33 on the inside of the recess 28 in the stem 25. This is a relative rotation vis-a-vis the cam 35 and stem 25, since the stem 25 is now held from further rotation while the cam 35 is rotated with the shaft 40 (now disengaged from the inverted cup-shaped element 53). Such rotation of the cam 35 will rock the core by moving the stem 25 in the manner indicated by FIG. 8 so that the core is rotated a limited amount around the tangential axis 19. This, of course, will force the hard faced ring 94 into pressure contact with the hard faced seat ring 91 of the valve.

It will be observed that this structure provides for a very low profile of the valve parts, while it maintains adequate strength to apply necessary forces in closing th valve against high pressure conditions.

While a particular embodiment of the invention has been described above in considerable detail in accordance with the applicable statutes, this is not to be taken as in any way limiting the invention but merely as being descriptive thereof.

I claim:

1. In combination with a ball type valve for use in high pressure or severe conditions, said valve having a valve handle and a spherical core cooperating with a valve seat in a body with a fluid passage therethrough, said core being rotatable about an axis transverse to said fluid passage and having an opening therethrough for alignment with said passage when in the fully open position, and said core being also rotatable a limited amount about another axis tangential to said core for forcing it against said seat, the improvement comprising a short stem on said core coaxial with said transverse axis,
   a pair of parallel flat faces on the outside of said stem and lying transverse to the axis of said opening through the core,
   an axially located recess in said stem,
   said recess having a radially contoured cam surface on the walls thereof,
   a cam operatively related to said cam surface and integrally attached to one end of a shaft for connecting the cam to said handle,
   said shaft having a hexagonal element integral therewith located adjacent to said cam,
   an inverted cup-shaped cylindrical element having a complementary hexagonal opening for cooperating with said hexagonal element and located axially in the bottom of said cylindrical element,
   said cylindrical element having a pair of parallel flat faces on the inside for cooperating with said stem flat faces to cause said stem and cylindrical element to rotate together at all times while permitting lateral movement of said stem relative to said cylindrical element,
   a pressure seal mounted on said valve body and supporting said shaft, and
   a lever associated with said handle for shifting said shaft longitudinally from one position with said hexagonal element engaged in said hexagonal opening in order to be able to rotate said core to and from the fully opened position by rotating said cylindrical element,
   said shaft rotating said cam relative to said stem when shifted to the other position so as to force said core against said seat by rotating the core a limited amount about said tangential axis.

2. In combination with a ball type valve for use in high pressure or severe conditions, said valve having a valve handle and a spherical core cooperating with a valve seat in a body with a fluid passage therethrough, said core being rotatable about an axis transverse to said fluid passage and having an opening therethrough for alignment with said passage when in the fully open position, and said core being also rotatable a limited amount about another axis tangential to said core for forcing it against said seat, the improvement comprising means for actuating said core with less than a half turn of said handle for each of said rotations,
   said core actuating means comprising,
   a shaft stem on said core coaxial with said transverse axis and having an axially located recesses therein,
   a radially contoured cam surface on said recess,
   a cam operatively connected to said handle and located in operative relation with said cam surface in order to force said core against said seat, and
   means for alternatively rotating said stem and said cam relative to said stem for closing and tightening said valve, respectively, said last named means comprising
   a shaft for connecting said handle with said cam,
   a lever associated with said handle and said shaft for shifting said shaft from engaging to disengaging position and back, a coupling member engaging said stem for rotation therewith while permitting lateral movement of said stem relative thereto, and clutch means for alternatively engaging and disengaging said shaft with said coupling member, said clutch means comprising a non-circular element integral with said shaft, and a complementary opening in said coupling member for receiving said non-circular element, said shaft being longitudinally shiftable by said lever for engaging and disengaging said non-circular element with said complementary opening.

3. The invention according to claim 2, wherein said stem has parallel flat faces on the outside thereof and transverse to the axis of said opening through the core, and said coupling member comprises an inverted cup-shaped cylindrical element having said complementary opening axially located in the bottom thereof, and parallel flat faces on the inside for cooperating with said stem flat faces to cause said stem and coupling member to rotate together at all times while permitting lateral movement of the stem relative to said cylindrical element.

* * * * *